(12) United States Patent
Chamberlain

(10) Patent No.: US 8,759,717 B2
(45) Date of Patent: Jun. 24, 2014

(54) ELECTRICALLY HEATED WINDOW

(75) Inventor: Mark Andrew Chamberlain, Ormskirk (GB)

(73) Assignee: Pilkington Group Limited, St Helens, Merseyside (GB)

(*) Notice: Subject to any disclaimer, the term of this patent is extended or adjusted under 35 U.S.C. 154(b) by 49 days.

(21) Appl. No.: 13/391,771

(22) PCT Filed: Jul. 22, 2010

(86) PCT No.: PCT/GB2010/051213
§ 371 (c)(1),
(2), (4) Date: Feb. 22, 2012

(87) PCT Pub. No.: WO2011/023974
PCT Pub. Date: Mar. 3, 2011

(65) Prior Publication Data
US 2012/0152930 A1 Jun. 21, 2012

(30) Foreign Application Priority Data
Aug. 27, 2009 (GB) .................................. 0914961.8

(51) Int. Cl.
*H05B 3/00* (2006.01)
*H05B 11/00* (2006.01)
*H05B 3/16* (2006.01)
*B60L 1/02* (2006.01)

(52) U.S. Cl.
USPC ............................ 219/203; 219/543; 219/200

(58) Field of Classification Search
USPC ......... 219/522, 200–203, 219, 528, 543–549; 428/156; 204/192.1; 29/611; 338/307–332
See application file for complete search history.

(56) References Cited

U.S. PATENT DOCUMENTS

| 3,601,583 | A | | 8/1971 | Fujiwara |
|---|---|---|---|---|
| 4,443,691 | A | | 4/1984 | Sauer |
| 6,011,244 | A | * | 1/2000 | Castle et al. ................... 219/522 |
| 2002/0005398 | A1 | * | 1/2002 | Gillner et al. .................. 219/203 |
| 2002/0015824 | A1 | * | 2/2002 | Kawamoto et al. ............ 428/156 |
| 2002/0092849 | A1 | * | 7/2002 | Petrenko ........................ 219/772 |
| 2003/0042045 | A1 | | 3/2003 | Koskenmaki et al. |

(Continued)

FOREIGN PATENT DOCUMENTS

| DE | 33 23 670 A1 | 1/1985 |
|---|---|---|
| EP | 0 788 294 A2 | 8/1997 |

(Continued)

OTHER PUBLICATIONS

Search Report dated Nov. 17, 2009, issued in corresponding United Kingdom Application No. GB0914961.8. (1 page).

(Continued)

*Primary Examiner* — Dana Ross
*Assistant Examiner* — Michael Laflame, Jr.
(74) *Attorney, Agent, or Firm* — Buchanan Ingersoll & Rooney P.C.

(57) ABSTRACT

An electrically heated window comprising at least two plies of a glazing material; at least one ply of an interlayer material; a grid of at least one electrically conductive pathway attached to a film; and an electrical connector for supplying current to the grid in order to heat the window; wherein the at least one ply of an interlayer material, the grid and the film are laminated between the at least two plies of a glazing material.

26 Claims, 9 Drawing Sheets

(56) References Cited

U.S. PATENT DOCUMENTS

Figure 1:
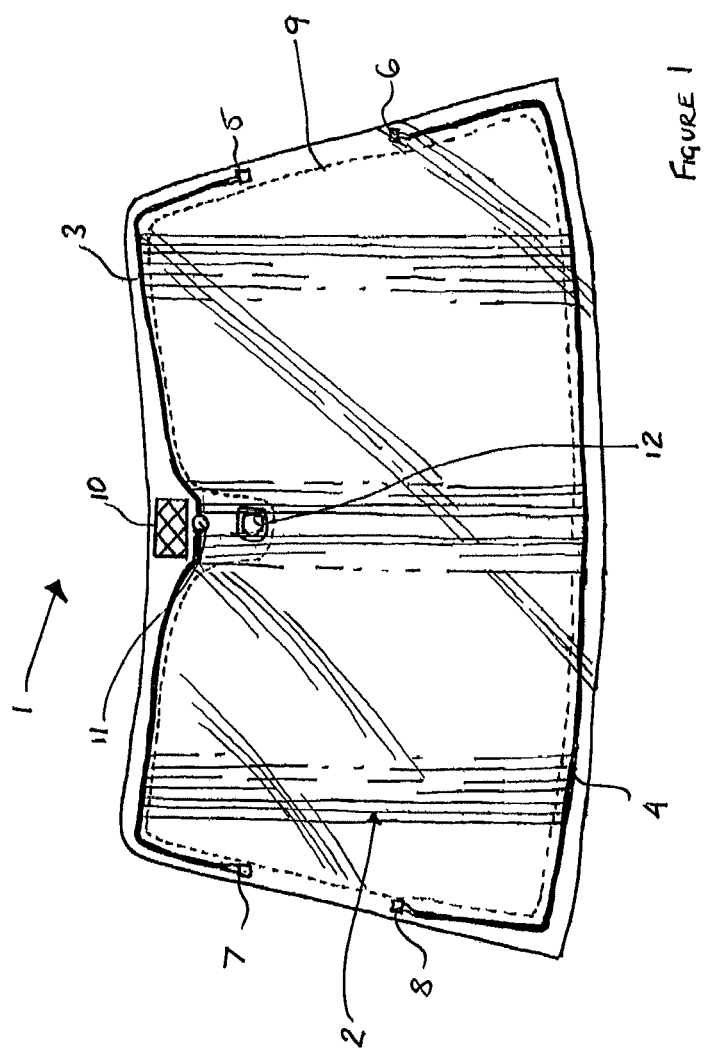

| | | |
|---|---|---|
| 2004/0033369 A1 | 2/2004 | Fleming et al. |
| 2004/0200821 A1* | 10/2004 | Voeltzel .......................... 219/203 |
| 2006/0186105 A1* | 8/2006 | Voeltzel et al. ............... 219/203 |
| 2007/0108175 A1* | 5/2007 | Andrt ............................. 219/203 |
| 2008/0028697 A1 | 2/2008 | Li et al. |

FOREIGN PATENT DOCUMENTS

| | | |
|---|---|---|
| EP | 1 145 842 A2 | 10/2001 |
| FR | 2 202 858 A1 | 5/1974 |
| GB | 2 091 528 A | 7/1982 |
| WO | WO 00/76930 A1 | 12/2000 |
| WO | WO 2007/039747 A1 | 4/2007 |

OTHER PUBLICATIONS

International Search Report (PCT/ISA/210) issued on Feb. 21, 2011, by United Kingdom Patent Office as the International Searching Authority for International Application No. PCT/GB2010/051213.

\* cited by examiner

ELECTRICALLY HEATED WINDOW

This invention relates to an electrically heated window, in particular, a laminated electrically heated window comprising a grid of at least one electrically conductive pathway attached to a film, its method of manufacture and its use. This invention also relates to a vehicle incorporating said electrically heated window.

Electrically heated windows are commonly used as either windscreens or backlights in vehicles in order to be able to demist or defrost the window in cold and/or damp weather conditions. For windows used as a windscreen in a vehicle, the electrical heating means are generally provided as an array of fine (having a diameter of less than 30 micrometers), closely spaced (a wire-to-wire distance of between 1 mm and 3 mm) wires. Although the wires in such an array are generally parallel, each is ordinarily provided with undulations, such as crimping in a sinusoidal, helical, zig zag or random pattern, to avoid dazzling and polarisation effects when objects are viewed through the window by a vehicle driver.

Heating functionality has traditionally been provided by incorporating tungsten heating elements within a laminate, as described in EP 0 788 294, or by the inclusion of a conducting coating (for example sputtered onto an internal glass surface, as described in WO 00/76930, or on a separate plastic (PET) substrate). The tungsten wired product has the disadvantage of wire visibility which can be distracting to drivers of vehicles, especially if sections of a window, such as the sections of a windscreen adjacent the A-pillars of a car, do not comprise the tungsten wire, and therefore some original equipment manufacturers dislike the existing wired product. The coated heated product usually requires a supply voltage greater than the standard 12.0/13.0 Volts due to the sheet resistivity of the conducting coating (e.g. 42 Volts) to achieve a power density sufficient to defrost the windscreen.

Consequently, there exists a need to provide electrically heated windows that improve on the visibility that is exhibited through the existing tungsten wired heated windows. It is also desirable to provide electrically heated windows that meet legal light transmission requirements, can be fine tuned to suit a particular power supply (nominally 12/13.0 Volts), provide a durable product (warranty performance), reduce undesirable heating of the interior of a vehicle (by providing solar control properties) and allow for the simple incorporation of devices such as wiper de-icers, heated camera windows and toll sensors.

According to a first aspect of the present invention, there is provided an electrically heated window comprising:

at least two plies of a glazing material;
at least one ply of an interlayer material;
a grid of at least one electrically conductive pathway attached to a film; and
an electrical connection means for supplying current to the grid in order to heat the window;
wherein the at least one ply of an interlayer material, the grid and the film are laminated between the at least two plies of a glazing material.

It is to be understood that, in the context of this invention, "grid" means a framework of at least one crisscrossed or parallel electrically conductive pathways based on, for example, square, rectangular, triangular, hexagonal and/or diamond-shaped cells. The at least one pathways may be any suitable shape such as straight, curved or sinusoidal. This arrangement is advantageous because it enables the grid to more easily function coextensively with the plies of a glazing material. In an existing tungsten wired heated window, the shape of the window may not allow the same length of tungsten wire to be incorporated throughout the window, such as in the sections of a windscreen adjacent the A-pillars of a car. This can affect the local power density achieved due to differences between the resistances of wires with differing lengths. This creates regions of non-constant temperature, known as hot spots. The presence of one or more hot spots in a window is highly undesirable for two reasons: firstly, there is a risk that the occupants of a vehicle in which such a window is fitted may touch the window in the region of the one or more hotspots, causing injury; and secondly, there is a risk of the window locally de-laminating in the region of the hot spots. This results in regions of the window having reduced or zero visibility.

The use of a grid solves this problem as it effectively forms a resistive sheet which allows current paths of approximate equal length to be achieved between the electrical connection means at for instance opposing edges of a windscreen.

Preferably the grid is a framework of square or rectangular cells.

The grid may be substantially coextensive within the two plies of a glazing material.

The at least one electrically conductive pathway may be manufactured from a material selected typically from the group consisting of silver, copper, gold, or aluminium. Other metals of low resistivity typically less than $8\times10^{-8}$ may be suitable such that they can provide the necessary sheet resistance of 0.1 to 1.0 ohm-square whilst maintaining adequate visibility. Preferably the at least one electrically conductive pathway is silver.

The film may be a polymer film. The polymer film may be selected from the group consisting of polyethylene terephthalate (PET), polyethylene (PE), cross-linked polyethylene (PEX), polyphenyl ether (PPE), polyvinyl chloride (PVC), polyvinylidene chloride (PVDC), polylactic acid (PLA), polypropylene (PP), polybutylene (PB), polybutylene terephthalate (PBT), polyamide (PA), polyimide (PI), polycarbonate (PC), polytetrafluoroethylene (PTFE), polystyrene (PS), polyurethane (PU), polyester (PEs), acrylonitrile butadiene styrene (ABS), polymethyl methacrylate (PMMA), polyoxymethylene (POM), polysulfone (PES), styrene-acrylonitrile (SAN), ethylene vinyl acetate (EVA), and styrene maleic anhydride film. Preferably the polymer film is polyethylene terephthalate film.

The film may have a thickness of less than 200 micrometers, preferably less than 100 micrometers, more preferably less than 75 micrometers, even more preferably less than 50 micrometers, and most preferably less then 30 micrometers. A thinner film can be advantageous because the thicker the film is, the more likely it is that lamination into complex shapes will result in wrinkling of the film.

The interlayer material may be selected from the group consisting of polyvinyl butyral (PVB), Ethylene-Vinyl Acetate (EVA) and other polymeric interlayers.

The window may exhibit a light transmission of at least 70%, preferably at least 75%, such as for windscreens. The window may exhibit a light transmission of less than 75%, such as for bodyglass.

The window may exhibit a haze of less than 7%, preferably less than 6%, more preferably less than 5%.

The window may exhibit a resistance typically from 0.1 to 1.0 ohm/square. This is advantageous because the resistance can be fine tuned to meet a required power density (for demist or de-frost functionality) such as a 12.0 to 13.0 Voltage supply which is used in a number of vehicles.

The electrical connection means may comprise at least two busbars. The at least two busbars may be laminated between the at least two plies of a glazing material.

The electrical connection means may further comprise an electrical connector connected to at least one of the at least two busbars.

To connect the grid to a power supply it is necessary obtain a good mechanical and electrical interface. This can be achieved using traditional copper busbars (already used within wired heated laminates). The busbar incorporation may be achieved by gluing the busbar to one of the at least two plies of a glazing material.

At least one of the busbars may be coated with a solder. It is advantageous to coat the busbars with a solder that will give a good electrical contact to the grid. The solder may be a silver-containing solder (with flux). Such a solder will give a good electrical interface to the grid. The solder may have a low melting point (<140° C.) such that the solder flows to form a soldered joint during a lamination process (see EP 1 110 431 on secure busbars).

At least one of the busbars may be crimped or have raised areas. This arrangement is beneficial because it gives an improved "pressure" contact point with the grid.

At least one of the busbars may be coated with a conducting adhesive. Such a busbar can be "glued" onto the grid and film. This arrangement affords a good electrical contact and sufficient bond strength to keep the busbar in position on the grid and film during assembly of the window.

Alternatively, at least one of the busbars may be a printed silver busbar which may be incorporated onto one of the at least two plies of a glazing material at an interior laminating surface to give a mechanical contact with the grid attached to the film upon assembly.

The grid attached to the film may further comprise a coating of at least one electrical conductor such as copper and/or nickel. Such a coating can be advantageous because it can improve the solar control properties of the window due to its reflective properties. At least one crimped busbar can be utilised to allow raised points on the at least one busbar to break through the coating during lamination. This arrangement improves the quality of the interface between the grid and the at least one busbar.

Such a coating on the grid can be removed mechanically (using abrasion) or chemically. Removal of the coating improves the quality of the interface between the grid and the at least two busbars.

The grid may have an increased surface area of the at least one electrically conductive pathway in a region adjacent at least one busbar. This arrangement improves the quality of the interface between the grid and the at least one busbar.

The grid may have an increased thickness of at least one electrically conductive pathway in a region adjacent at least one busbar. It is to be understood that, in this context, "thickness" means the height of the at least one electrically conductive pathway from a connecting surface of the polymer film. This arrangement improves the quality of the interface between the grid and at least one busbar by improving solderability. The thickness of the at least one electrically conductive pathway in regions not adjacent the at least one busbar may be 2 to 30 micrometers, preferably 3 to 20 micrometers, more preferably 4 to 15 micrometers, even more preferably 5 to 13 micrometers, most preferably 6 to 12 micrometers. The thickness of at least one electrically conductive pathway in regions adjacent the at least one busbar may be at least 2 micrometers, preferably at least 10 micrometers, more preferably at least 20 micrometers, even more preferably at least 30 micrometers, even more preferably at least 40 micrometers.

When the grid comprises a framework of square or rectangular cells, the at least one electrically conductive pathways may be arranged either in a first direction ("vertical" pathways) or in a second direction ("horizontal" pathways).

In some embodiments the grid may comprise more vertical pathways than horizontal pathways. A grid arrangement with fewer pathways is advantageous because it increases the light transmission through the window. It is also advantageous to retain some horizontal pathways to act as an alternate current path should some of the vertical pathways become damaged.

The distance between adjacent vertical and/or between adjacent horizontal pathways may be at least 100 micrometers, preferably at least 300 micrometers, more preferably at least 500 micrometers, even more preferably at least 1000 micrometers, even more preferably at least 1500 micrometers, most preferably at least 2000 micrometers. Increasing the distance between adjacent vertical and/or horizontal pathways increases the "open area" (i.e. the cross-sectional portions of the window that do not comprise electrically conductive pathways), allowing a greater light transmission. To reduce any optical distortion during the heating of the product, such as shimmer distortion, it is preferred to have a minimum spacing of adjacent vertical pathways of approximately 2.0 mm (2000 micrometers).

The width of the at least one electrically conductive pathways may be less than 50 micrometers, preferably less than 25 micrometers, even more preferably less than 17 micrometers, even more preferably less than 15 micrometers and most preferably less than 13 micrometers. It is beneficial for the width of the pathways to be smaller in order to improve the light transmission.

The window may further comprise an additional film laminated between another two plies of a glazing material, wherein the additional film comprises a coating capable of at least partially reflecting light. Such a film can be beneficial because many windows, such as some automotive windows, require improved solar control performance to reduce undesirable heating of the interior of a vehicle. Said coating capable of at least partially reflecting light may be metallic.

Alternatively, the film attached to a grid of at least one electrically conductive pathway may, on an opposing surface, further comprise a coating capable of at least partially reflecting light. This arrangement is advantageous because it reduces the assembly complexity of the window. Alternatively, or additionally, a coating capable of at least partially reflecting light may be located on the same surface of the film that is attached to the grid.

The grid may comprise one or more gaps in one or more of the electrically conductive pathways. Sections of the grid may be deleted by suitable methods such as mechanical abrasion, laser deletion and/or chemical deletion. Such modification of the grid design can be advantageous in order to allow, for example, for bespoke separate circuit functionality for wiper de-icers, heated camera windows, and to prevent electro magnetic inference for certain devices such as toll sensors and rain sensors. Alternatively the grid may be manufactured as new with sections deleted to avoid the need for a deletion process. The window may further comprise one or more of a wiper de-icer, a heated camera window, a toll sensor and rain sensor According to another aspect of the present invention, there is provided a method of manufacturing an electrically heated window comprising:

laminating at least one ply of an interlayer material, and a grid of at least one electrically conductive pathway attached to a film between at least two plies of a glazing material, and providing an electrical connection means for supplying current to the grid in order to heat the window.

According to another aspect of the present invention, there is provided the use of an electrically heated window according to the invention in a vehicle, such as a car, van, truck, bus, coach, locomotive, aircraft, boat or ship.

According to another aspect of the present invention, there is provided a vehicle incorporating at least one electrically heated window according to the invention.

It will be appreciated that optional features applicable to one aspect of the invention can be used in any combination, and in any number. Moreover, they can also be used with any of the other aspects of the invention in any combination and in any number. This includes, but is not limited to, the dependent claims from any claim being used as dependent claims for any other claim in the claims of this application.

Figure 2:
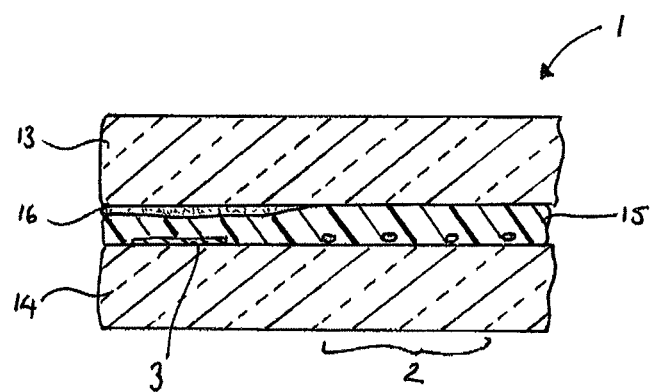
Figure 3:
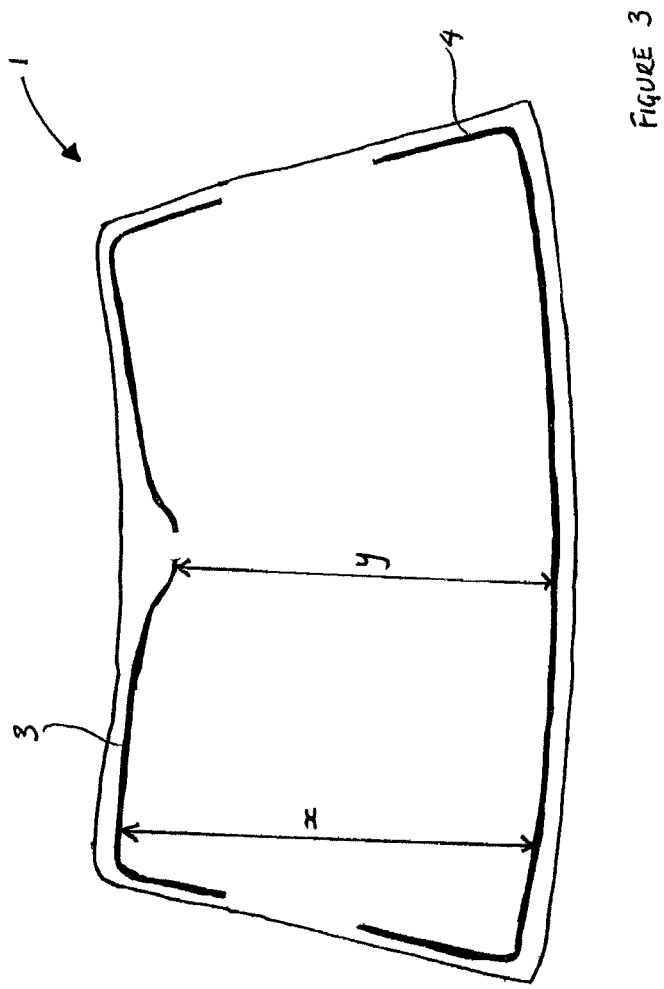
Figure 4:
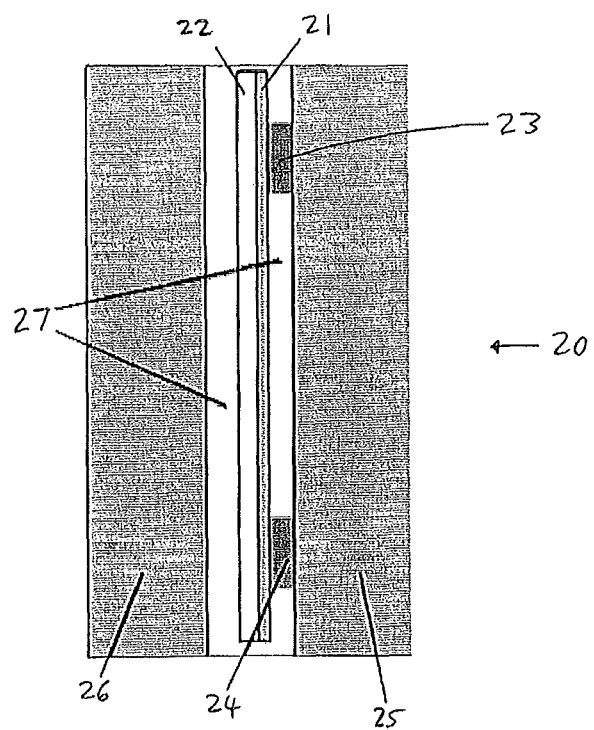
Figure 5:
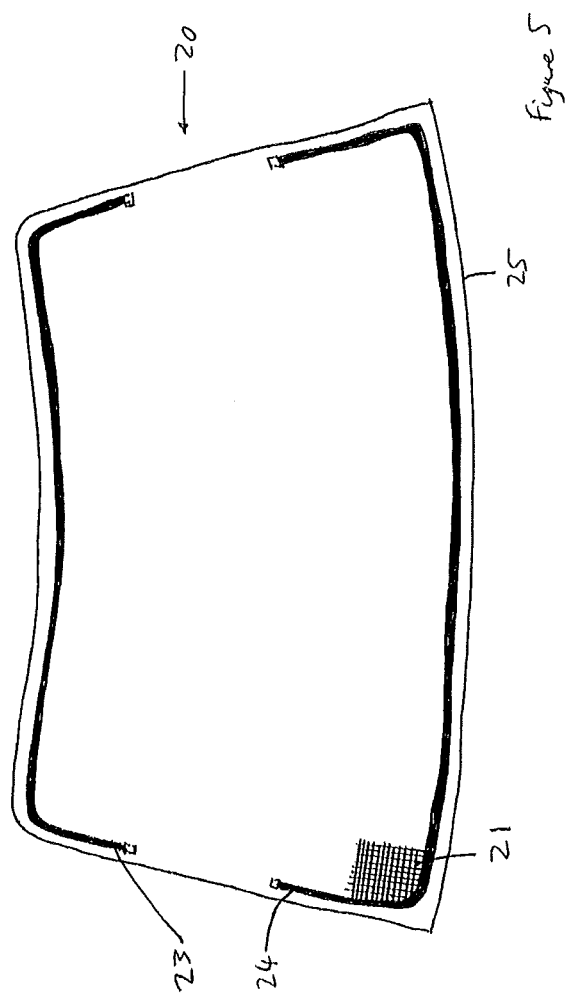
Figure 6:
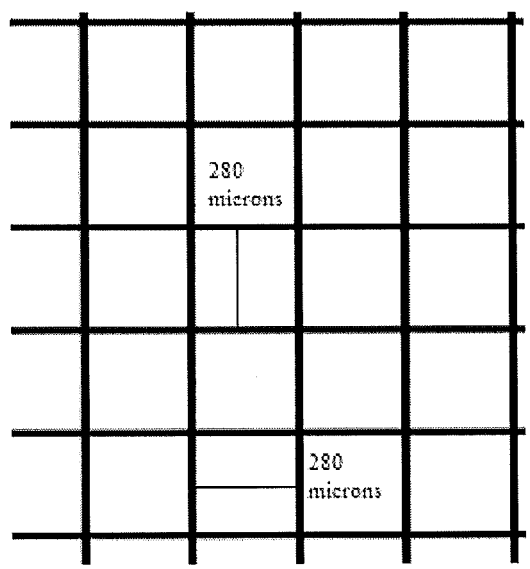
Figure 7:
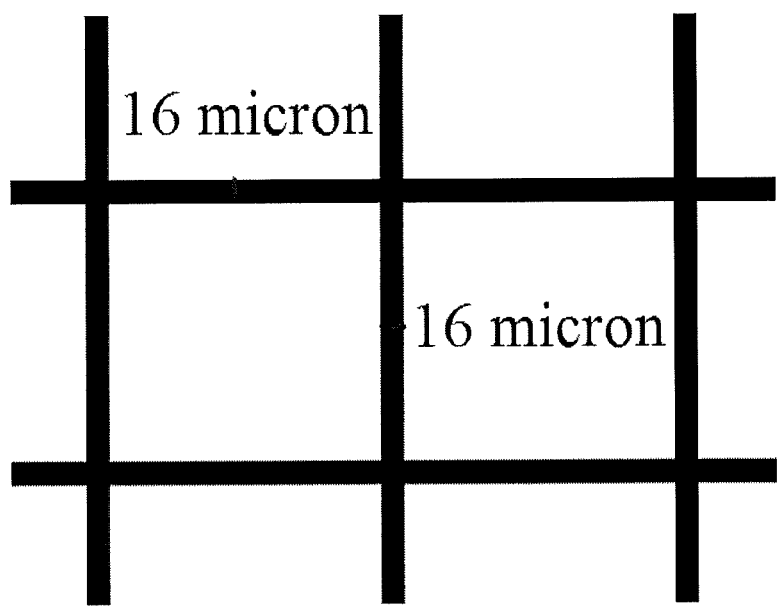
Figure 8:
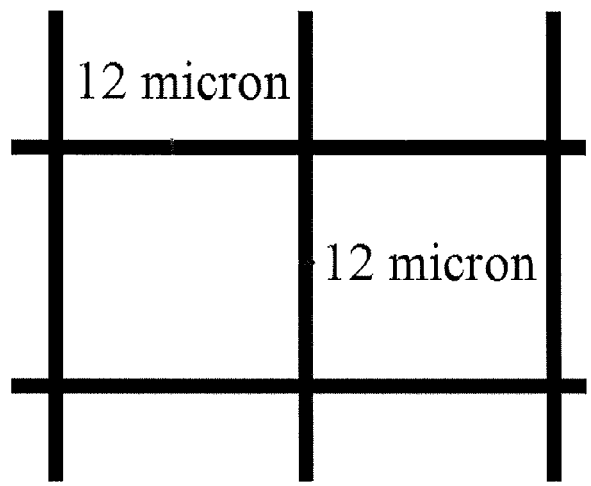
Figure 9:
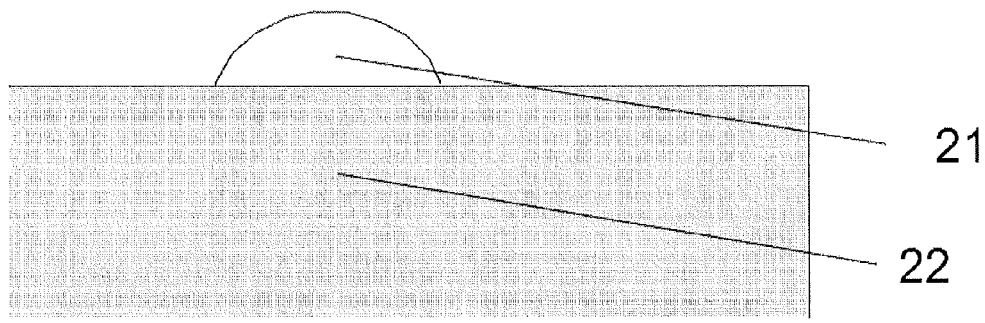
Figure 10:
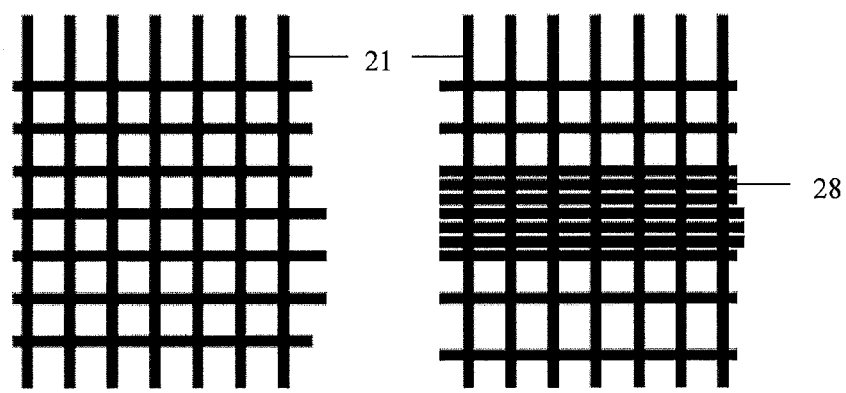
Figure 11:
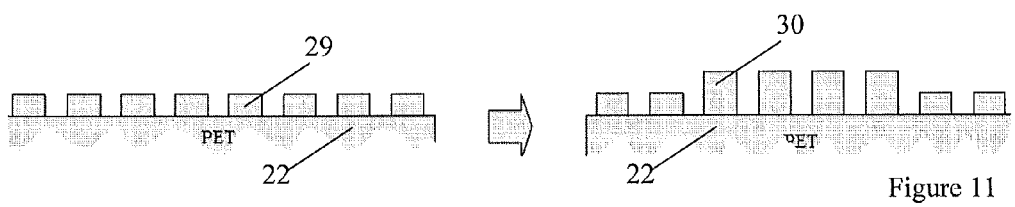
Figure 12:
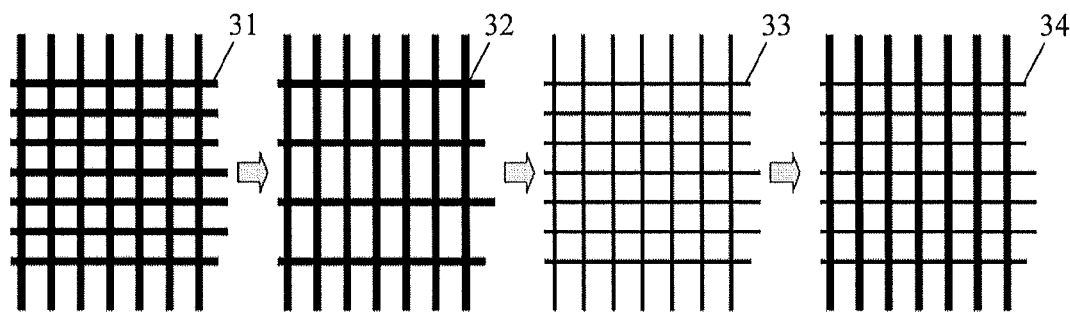
Figure 13:
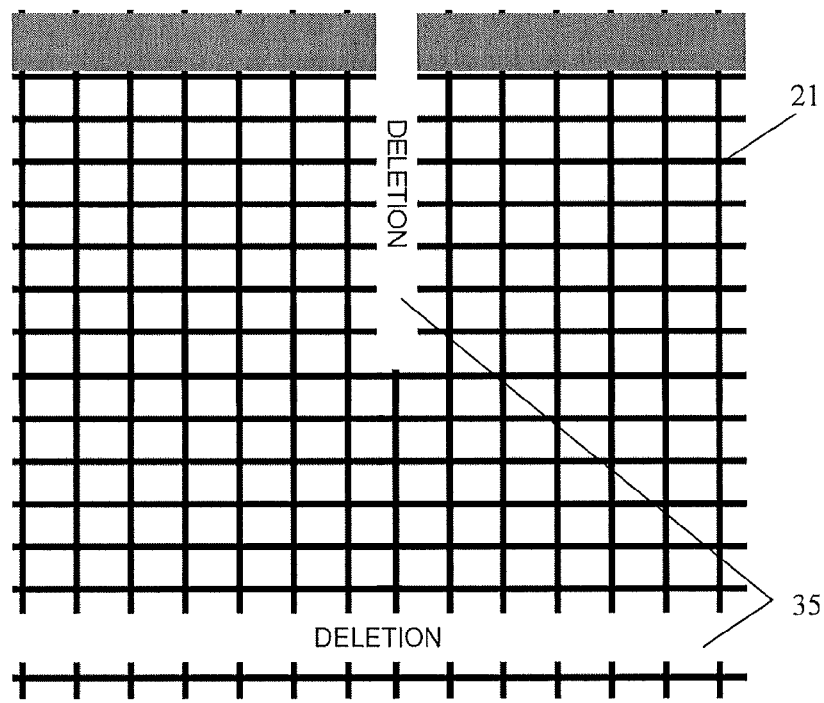
Figure 14:
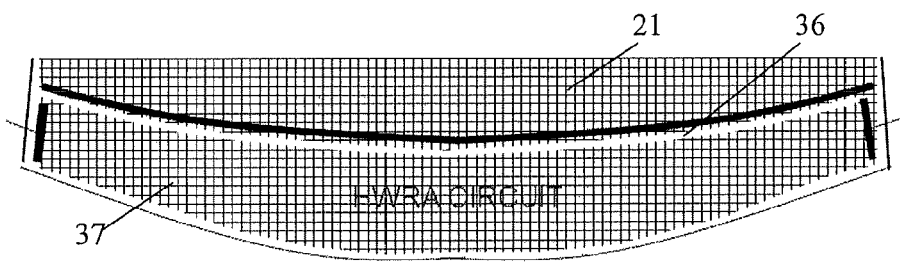
Figure 15:
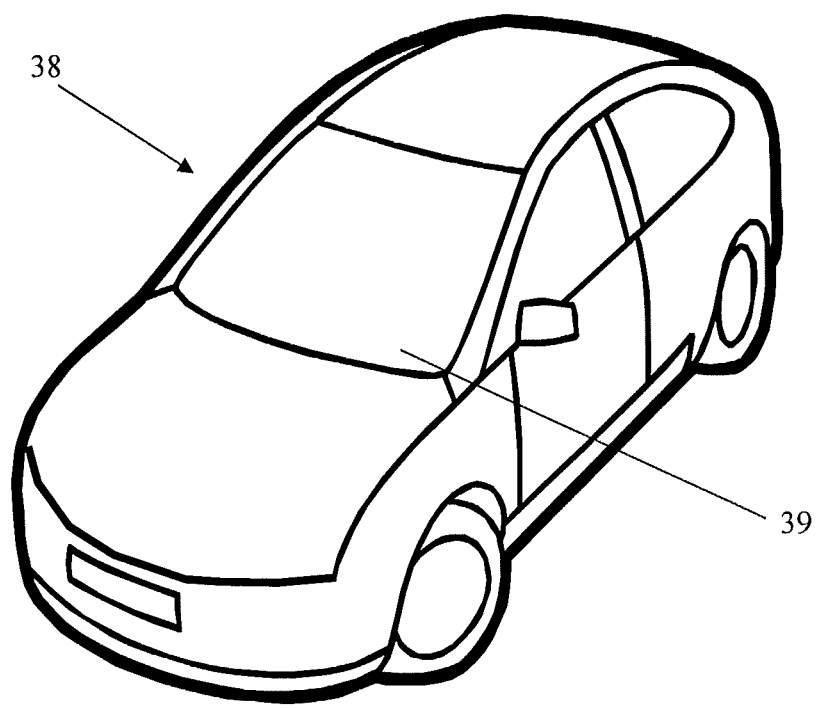

An embodiment of the present invention will now be described herein, by way of example only, with reference to the following figures:

FIG. 1—shows a schematic plan view of a wire-heated window having a wire-free area in accordance with the prior art;

FIG. 2—shows a schematic cross-section of a side edge region of the wire-heated window shown in FIG. 1;

FIG. 3—shows a schematic plan view of the window in FIG. 1, showing bus bar separations;

FIG. 4—shows a schematic cross section of an electrically heated window according to an embodiment of the invention;

FIG. 5—shows a schematic plan view of the window in FIG. 4;

FIG. 6—shows a schematic plan view of a silver grid attached to a PET film highlighting grid dimensions;

FIG. 7—shows a schematic plan view of a silver grid attached to a PET film highlighting a pathway width of 16 micrometers;

FIG. 8—shows a schematic plan view of a silver grid attached to a PET film highlighting a pathway width of 12 micrometers;

FIG. 9—shows a schematic view of a cross section of a pathway of a silver grid attached to a PET film;

FIG. 10—shows a schematic plan view of an unmodified grid (left) and a grid with an increased pathway surface area in a particular region (right);

FIG. 11—shows a schematic cross sectional view of the pathways of a grid attached to a PET film with unmodified pathways (left) and pathways with increased thickness (right);

FIG. 12—shows a schematic plan view of, from the far left, an unmodified grid, a grid with reduced numbers of horizontal pathways, a grid with reduced pathway width and a grid with reduced horizontal pathway width;

FIG. 13—shows a schematic plan view of a grid with gaps in some of the pathways;

FIG. 14—shows a schematic plan view of a grid with gaps in some of the pathways in order to allow for a heated wiper rest area circuit; and FIG. 15—shows a perspective view of a vehicle according to an embodiment of the invention.

FIG. 1 is a schematic plan view of a wire-heated window in accordance with the prior art. The wire-heated window 1 is generally trapezoidal in shape, and comprises an array of fine, closely-spaced wires 2, of which only a small proportion are shown for clarity. The array of wires 2 is bounded by a first electrical connection means or bus bar 3 and a second electrical connection means or bus bar 4. The wires within the array 2 extend between the first and second electrical connection means 3, 4. These electrical connection means 3, 4 connect the array to an electrical supply (not shown) by means of connectors 5, 6, 7, 8, which may be plug connectors or other connectors known within the art. A dotted line 9 represents the extent to which the periphery of the window is covered by an obscuration band. An obscuration band is usually provided by a printed, fired black ceramic ink positioned on an inner surface of the window. The function of the obscuration band is two-fold: firstly, aesthetic, as it acts to hide the edge of the window and cover the adhesive used to bond the window into a vehicle, as well as the frame surrounding the window aperture; and secondly, it prevents degradation of the adhesive used to bond the window into the vehicle due to exposure to UV rays in sunlight.

A wire-free area 10 is represented by a hatched region, and in this example, is positioned adjacent the top edge of the window 1 (when fitted into a vehicle). A bus bar 3 is shaped so as to define the wire-free area to allow a data signal to be transmitted through the window to a device positioned in the vicinity of the wire-free area. Ideally, the wire-free area 10 is concealed by the obscuration band. In addition, the window 1 is provided with an area 11 for affixing a mirror boss, and an area 12 for affixing a sensor, such as a light or moisture sensor.

FIG. 2 is a schematic cross-section of a side edge region of the wire heated window shown in FIG. 1. The window 1 comprises first 13 and second 14 plies of annealed silicate float glass having a ply of polyvinyl butyral interlayer material 15 extending and laminated therebetween. The obscuration band 16 is provided around the periphery of the window 1, obscuring one of the bus bars 3. At the side of the window 1, the wires in the array 2 are parallel with the edge of the window 1.

FIG. 3 is a schematic plan view of the window in FIG. 1, showing bus bar separations. In FIG. 3, only the bus bars 3, 4 and the general shape of the window are shown for clarity. The bus bar 3 running along the top edge of the window 1, adjacent the wire-free region 10 is shaped to define the wire-free region, with several turns or corners. In this example, the bus bar 3 running along the top edge of the window 1 is in two portions, separated by a small break positioned on a line of approximate mirror symmetry vertically in the centre of the window 1.

The spacing between the bus bar 3 running along the top edge of the window 1 and the bus bar 4 running along the bottom edge of the window in an edge region of the window 1 (which would be adjacent the "A" pillar when fitted in a vehicle) is represented by distance x. The spacing between the bus bar 3 running along the top edge of the window 1 and the bus bar 4 running along the bottom edge of the window in the centre, adjacent the wire-free area 10 is represented by spacing y. Typically, the spacing y at the centre of the window 1 is 10% larger than the spacing x at the edge of the window 1 adjacent the "A" pillar. This leads to a region having the same width as the wire-free area having an increased temperature in comparison with the remainder of the window due to the decrease in resistance and consequential increase in current carried in the shorter wires. As the wire-free area may be up to 300 mm in width, this hot spot region may also be at least 300 mm in width.

FIG. 4 shows a schematic cross section of an electrically heated window 20 in accordance with an embodiment of the present invention. This embodiment solves the problem of hot spots by utilising a silver grid 21 which prevents variation in the resistance of individual pathways, minimising the occurrence of hot spots. The silver grid effectively acts as a conductive sheet in which the current does not necessarily flow perpendicular to the busbars. The grid can be modified (by deleting small sections manually by abrasion, laser deletion etc) to prevent localised hot spot formation. As with the above-mentioned prior art window, the window 20 is generally trapezoidal in shape (not shown) having two opposing long edges and two opposing shorter edges. The grid 21 is attached to a PET film 22 and is connected to two tinned copper busbars 23, 24. The grid 21, PET film 22 and busbars 23, 24 are laminated between two plies of clear glass 25, 26 using a PVB interlayer 27. The busbars 23, 24 are attached directly to the PVB interlayer 27 to contact the grid 21, or can be connected directly to the grid itself (via soldering or a conducting adhesive).

FIG. 5 shows a schematic plan view of the electrically heated window 20 shown in FIG. 4. FIG. 5 shows the generally trapezoidal shape of the window 20, along with a small proportion of the silver grid 21 for clarity. The pathways of the grid 21 have a thickness of 6 to 12 micrometers and a width of approximately 16 micrometers. The distance between adjacent vertical and/or adjacent horizontal pathways is 280 micrometers. The PET film 22 has a thickness of 100 micrometers. The busbars 23, 24 are 3 to 6 mm in width and 0.03 to 0.08 mm thick, with the tinned surface comprising either elemental Sn or an alloy having a Sn:Pb ratio of 60:40. The bus bars 23, 24 may be a single piece of foil, or may be formed of multiple pieces of foil, superimposed with the pathways of the grid 21 sandwiched partially in between. Typically the ply of PVB interlayer material 27 is 0.76 mm in thickness (two portions each of 0.38 mm in thickness), and the plies of glass are in the range 1.2 to 3.0 mm in thickness.

Although the invention is described in teens of annealed silicate float glass, other types of glass or glazing materials, such as polycarbonate or plastics may be used in place of such glass plies.

The busbars 23, 24 connect the grid 21 to an electrical supply (not shown) by means of connectors which may be plug connectors or other connectors known within the art. An obscuration band may be provided by a printed, fired black ceramic ink positioned on an inner surface of the window.

For good defrosting performance, it is generally desirable to ensure a uniform power density of 500-600 W/m$^2$ across the entire window. For demisting lower power densities (400 W/m$^2$) are acceptable. Higher power (2000 W/m$^2$) densities can be used for rapid defrosting of the wiper blade area.

FIG. 6 shows a schematic plan view of a silver grid attached to a PET film, highlighting grid dimensions. In this particular grid the distance between adjacent vertical and between adjacent horizontal pathways is 280 micrometers.

FIGS. 7 and 8 each show a schematic plan view of a silver grid attached to a PET film where the grid pathway width is 16 micrometers and 12 micrometers respectively.

FIG. 9 shows a schematic view of a cross section of a pathway of a silver grid 21 attached to a PET film 22. As can be seen, in this case the cross section of the pathway 21 is not symmetrical and, generally, the cross sectional shape of the pathways can be any suitable shape that allows current to flow through the pathways.

FIG. 10 shows a schematic plan view of an unmodified grid 21 (left) and a grid 21 with an increased pathway surface area in a particular region 28 (right). As detailed above, a grid 21 with an increased pathway surface area in a region adjacent a busbar improves the electrical and mechanical interface between the grid and the busbar.

FIG. 11 shows a schematic cross sectional view of the pathways of a grid attached to a PET film 22 with unmodified pathways 29 (left) and some pathways with increased thickness 30 (right). As detailed above, increasing the pathway thickness (the height above the surface of the PET) at a busbar interface area improves the interface between the grid and the busbar and improves solderability.

FIG. 12 shows a schematic plan view of, from the far left, an unmodified grid 31, a grid with reduced numbers of horizontal pathways 32, a grid with reduced pathway width 33 and a grid with reduced horizontal pathway width 34. As detailed above, reducing the number of individual pathways and/or the pathway width is beneficial because it improves the light transmission through the window.

FIG. 13 shows a schematic plan view of a grid 21 with gaps 35 in some of the pathways which is advantageous in some embodiments as it allows separate circuit functionality for heated camera windows, toll sensors etc. Similarly, FIG. 14 shows a schematic plan view of a grid 21 with gaps 36 in some of the pathways in order to allow for a heated wiper rest area circuit 37.

FIG. 15 shows a perspective view of a vehicle 38 according to an embodiment of the invention. The vehicle 38 incorporates an electrically heated window 39 according to the invention.

The invention claimed is:

1. An electrically heated window comprising:
    at least two plies of a glazing material;
    at least one ply of an interlayer material;
    a grid of at least one criss-crossed electrically conductive pathway attached to a film; and
    an electrical connection means for supplying current to the grid in order to heat the window;
    wherein the at least one ply of an interlayer material, the grid and the film are laminated between the at least two plies of a glazing material; and
    wherein the grid has an increased surface area of the at least one electrically conductive pathway in a region adjacent at least one busbar.

2. The electrically heated window of claim 1, wherein the grid is a framework of square or rectangular cells.

3. The electrically heated window of claim 1, wherein the at least one electrically conductive pathway may be manufactured from a material selected from the group consisting of silver, copper, gold and aluminium.

4. The electrically heated window of claim 1, wherein the film has a thickness of less than 50 micrometers.

5. The electrically heated window of claim 1, wherein the window exhibits a light transmission of at least 70%, preferably at least 75%.

6. The electrically heated window of claim 1, wherein the electrical connection means comprises at least two busbars.

7. The electrically heated window of claim 6, wherein at least one of the busbars is crimped or has raised areas.

8. The electrically heated window of claim 6, wherein at least one of the busbars is coated with a conducting adhesive.

9. The electrically heated window of claim 1, wherein the grid further comprises a coating of at least one electrical conductor.

10. The electrically heated window of claim 6, wherein the grid has an increased thickness of the at least one electrically conductive pathway in a region adjacent at least one busbar.

11. The electrically heated window of claim 6, wherein a thickness of the at least one electrically conductive pathway in regions not adjacent the at least one busbar is 5 to 13 micrometers.

12. The electrically heated window of claim 6, wherein a thickness of the at least one electrically conductive pathway in regions adjacent the at least one busbar is at least 20 micrometers.

13. The electrically heated window of claim 2, wherein the at least one electrically conductive pathway is arranged either in a first direction ("vertical" pathways) or in a second direction ("horizontal" pathways).

14. The electrically heated window of claim 13, wherein the grid comprises more vertical pathways than horizontal pathways.

15. The electrically heated window of claim 13, wherein a distance between adjacent vertical pathways is at least 2000 micrometers.

16. The electrically heated window of claim 1, wherein a width of the at least one electrically conductive pathways is less than 17 micrometers.

17. The electrically heated window of claim 1, wherein the window further comprises an additional film laminated between the at least two plies of a glazing material, wherein the additional film comprises a coating capable of at least partially reflecting light.

18. The electrically heated window of claim 1, wherein the film attached to a grid of at least one electrically conductive pathway further comprises a coating capable of at least partially reflecting light.

19. The electrically heated window of claim 1, wherein the grid comprises one or more gaps in one or more of the electrically conductive pathways.

20. A method of manufacturing an electrically heated window comprising:
   laminating at least one ply of an interlayer material, and a grid of at least one criss-crossed electrically conductive pathway attached to a film between at least two plies of a glazing material, and
   providing an electrical connection means for supplying current to the grid in order to heat the window,
   wherein the grid has an increased surface area of the at least one electrically conductive pathway in a region adjacent at least one busbar.

21. Use of an electrically heated window according to claim 1 in a vehicle, such as a car, van, truck, bus, coach, locomotive, aircraft, boat or ship.

22. A vehicle incorporating at least one electrically heated window according to claim 1.

23. The electrically heated window of claim 9, wherein the at least one electrical conductor comprises at least one of copper or nickel.

24. The electrically heated window of claim 13, wherein a distance between adjacent horizontal pathways is at least 2000 micrometers.

25. The electrically heated window of claim 15, wherein a distance between adjacent horizontal pathways is at least 2000 micrometers.

26. An electrically heated window comprising:
   at least two plies of a glazing material;
   at least one ply of an interlayer material;
   a grid of at least one criss-crossed electrically conductive pathway attached to a film; and
   an electrical connection means for supplying current to the grid in order to heat the window;
   wherein the at least one ply of an interlayer material, the grid and the film are laminated between the at least two plies of a glazing material; and
   wherein the grid has an increased thickness of the at least one electrically conductive pathway in a region adjacent at least one busbar.

* * * * *